Patented Oct. 2, 1934

1,975,233

UNITED STATES PATENT OFFICE 1,975,233

AZO DYES AND METHOD FOR THEIR PREPARATION

Arthur Howard Knight, Ashton-on-Mersey, England, assignor to Imperial Chemical Industries Limited, a corporation of Great Britain No Drawing. Application September 21, 1932, Serial No. 634,200. In Great Britain September 30, 1931

12 Claims. (Cl. 260—81)

This invention relates to azo dyes and more particularly refers to disazo dyes which are especially adapted for dyeing acetyl silks in colors ranging from Bordeaux to violet shades.

Very few azo dyes capable of imparting Bordeaux to violet shades to acetyl silks are known at the present time. Consequently it is an object of the present invention to produce azo dyes which may accomplish this purpose. It is a further object to produce dyes having excellent fastness to washing and light. Additional objects will appear hereinafter.

These objects are attained by the herein-described invention wherein a diazotized amino compound of the benzene or naphthalene series, which is free from nitro, hydroxy, sulfonic acid or carboxylic acid groups, is coupled with a dialkoxy aniline, the resulting amino-azo compound being diazotized and coupled with amines of the benzene and naphthalene series, free from hydroxy, carboxylic acid and sulfonic acid groups.

The invention may be more completely understood by reference to the following illustrative examples.

Example 1

The solution obtained by diazotizing 127.5 parts of p-chloro-aniline in the customary manner was added to a solution of 153 parts of 2-5-dimethoxy-aniline in 370 parts of 10% hydrochloric acid and 6000 parts of water. When the combination was complete about 10,000 parts of water were added. The so-diluted suspension of the mono-azo compound was heated to 40° C. 76 parts of sodium nitrite were then added, the mixture being stirred until diazotization was complete, the diazo-azo compound passing into solution. This solution was filtered, if necessary, and cooled to 20° C. It was then added to a solution of 108 parts of m-phenylene-diamine in 8000 parts of water. The mixture was stirred until combination was complete when the dyestuff, which was out of solution, was filtered off, washed with water, and preserved as a paste. It dyed cellulose acetate in Bordeaux shades.

The dyestuff paste containing one part of the dyestuff prepared according to Example 1 was added to the dye bath containing a very small amount (about 1/100th part) of the substance obtained by condensing naphthalene sulfonic acid with formaldehyde (cf. Example 1 of British Patent No. 224,077) and to the lukewarm dye bath was then added 100 lbs. of cellulose acetate yarn. The temperature was raised to 80° C. during half an hour and the material was dyed for a further half an hour at this temperature. It was then washed and dried in the usual way, giving a Bordeaux dyeing.

Example 2

The solution obtained by diazotizing 127.5 parts of o-chloro-aniline in the customary manner was added to a solution of 153 parts of 2-5-dimethoxy-aniline in 370 parts of 10% hydrochloric acid and 6000 parts of water at 10° C. As coupling proceeded the mono-azo compound separated from solution. The mixture was stirred at 10° C. until combination was complete. The temperature of the mixture was then raised to 20° C. and 72 parts of sodium nitrite were added. After stirring for about three hours the solution of diazo-azo compound was added to a solution of 171 parts of ethyl-alpha-naphthylamine in 370 parts of 10% hydrochloric acid and 8000 parts of water, and the mixture was stirred until combination was complete. The dyestuff, which was out of solution, was then filtered off, washed with water, and preserved as a paste. It dyed cellulose acetate in bluish-violet shades when applied in the manner described in Example 1.

Example 3

The solution obtained by diazotizing 141.5 parts of 5-chloro-o-toluidine in the customary manner was added to a solution of 153 parts of 2-5-dimethoxy-aniline in 370 parts of 10% hydrochloric acid and 6000 parts of water at 10° C. Coupling was completed by neutralizing the mineral acid with sodium acetate. The suspension of the so-formed mono-azo compound was diluted with 2000 parts of water and heated to 50° C. 850 parts of 10% hydrochloric acid were then added followed by 82 parts of sodium nitrite. The mixture was stirred until diazotization was complete, the diazo-azo compound being in solution. This solution was filtered, if necessary, and cooled to 20° C., when some diazo-azo compound may separate. The mixture was then added to a solution of 144 parts of alpha-naphthylamine in 370 parts of 10% hydrochloric acid and 8000 parts of water. The mixture so-obtained was stirred until combination was complete when the dyestuff, which was out of solution, was filtered off, washed with water, and preserved as a paste. It dyed cellulose acetate in violet shades when applied in the manner described in Example 1.

The first component of these new compounds is aniline, naphthylamine, or derivatives thereof, free from nitro, hydroxy, sulfonic and carboxylic acid groups. However, with the exception of these four groups the component may have other groups substituted thereon without impairing the desirable qualities of the resulting products. Examples of a few of these compounds are aniline, para-phenetidine, ortho-anisidine, alpha-naphthylamine, and beta-naphthylamine.

The second component is a dialkoxy aniline free from hydroxy, sulfonic acid and carboxylic acid groups. In the examples only 2-5-dimethoxy-aniline was used as a second component. Very satisfactory results may be obtained by substituting for this compound other dialkoxy anilines in which the alkoxy groups may be the same or dissimilar, and in which they may occupy other positions on the benzene residue than the 2-5-positions. The dialkoxy aniline selected must, of course, be capable of coupling with the first component as well as be capable of diazotization. No difficulty should be encountered by one skilled in the art in selecting suitable compounds for this substituent.

The third component is chosen from amines of the benzene or naphthalene series, free from hydroxy, carboxylic acid and sulfonic acid groups. Among these compounds may be mentioned 4-chloro-meta-phenylene-diamine, and meta-toluylene-diamine. These compounds may have groups substituted thereon in the benzene or naphthalene nucleus or on the amino group.

It is to be understood that the conditions under which the process is carried out may be varied within rather wide limits without departing from the scope of the present invention. In some cases diazotization may be effected more advantageously by raising the temperature to a certain extent. Since the mechanics of diazotization and coupling are well known no difficulty should be encountered in selecting the proper conditions under which to diazotize and couple any given components.

The compounds referred to herein are especially adapted for dyeing and printing cellulose esters and ethers, and in addition have many other uses. They are fast to light and washing and are a welcome addition to the small number of azo dyes now suitable for dyeing acetyl silks in shades ranging from Bordeaux to violet.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized amino compound of the benzene or naphthalene series, which may have substituted thereon members selected from the group consisting of halogen, alkyl, and alkoxy, with a dialkoxy aniline, diazotizing the resulting amino-azo compound and coupling it with an amino compound of the benzene or naphthalene series which may have substituted thereon members selected from the group consisting of halogen, amino, alkyl-amino and alkyl.

2. A process for producing azo dyes which comprises coupling a diazotized aniline, which may have substituted thereon members selected from the group consisting of halogen, alkyl and alkoxy, with a 2-5-dialkoxy aniline, diazotizing the resulting amino-azo compound and coupling it with an amino compound of the benzene or naphthalene series which may have substituted thereon members selected from the group consisting of halogen, amino, alkyl-amino and alkyl.

3. A process for producing azo dyes which comprises coupling a diazotized member selected from the group consisting of p-chloro-aniline, o-chloro-aniline, and 5-chloro-o-toluidine, with 2-5-dimethoxy-aniline, diazotizing the resulting amino-azo compound and coupling it with a member selected from the group consisting of m-phenylene-diamine, ethyl-alpha-naphthylamine, and alpha-naphthylamine.

4. A process for producing azo dyes which comprises coupling diazotized p-chloro-aniline with 2-5-dimethoxy-aniline, diazotizing the resulting aminoazo compound and coupling it with m-phenylene-diamine.

5. A process for producing azo dyes which comprises coupling diazotized o-chloro-aniline with 2-5-diamethoxy-aniline, diazotizing the resulting aminoazo compound and coupling it with ethyl-alpha-naphthylamine.

6. A process for producing azo dyes which comprises coupling diazotized 5-chloro-o-toluidine with 2-5-dimethoxy-aniline, diazotizing the resulting aminoazo compound and coupling it with alpha-naphthylamine.

7. Azo dyes having the following general formula:

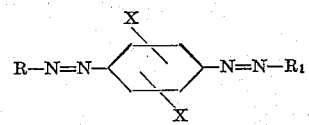

wherein R represents an aniline or naphthylamine residue, which may have substituted thereon members selected from the class consisting of halogen, alkyl and alkoxy groups, X represents an alkoxy group, and R₁ represents an amino-benzene or amino-naphthalene residue, which may have substituted thereon members selected from the class consisting of halogen, amino, alkyl-amino and alkyl groups.

8. Azo dyes having the following general formula:

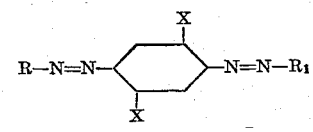

wherein R represents an aniline residue, which may have substituted thereon members selected from the class consisting of halogen, alkyl and alkoxy groups, X represents an alkoxy group, and R₁ represents an amino-benzene or amino-naphthalene residue, which may have substituted thereon members selected from the class consisting of halogen, amino, alkyl-amino and alkyl groups.

9. Azo dyes having the following general formula:

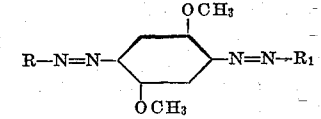

wherein R represents p-chloro-aniline, o-chloro-aniline or 5-chloro-o-toluidine, and R₁ represents m-phenylene-diamine, ethyl-alpha-naphthylamine, or alpha-naphthylamine.

10. An azo dye having the following formula:

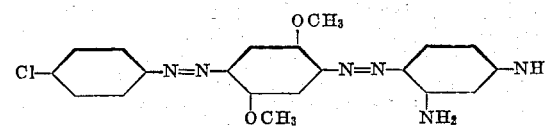

11. An azo dye having the following formula:
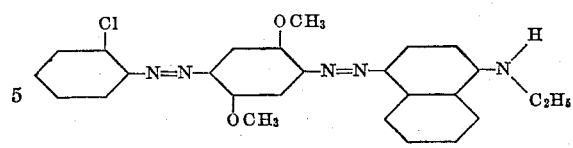
12. An azo dye having the following formula:
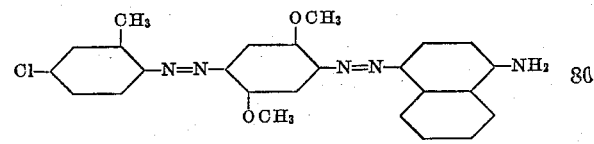
ARTHUR HOWARD KNIGHT.